C. T. RASCHICK.

COMBINED PAD HOLDER AND TICKET PUNCH.

APPLICATION FILED MAR. 24, 1920.

Reissued Jan. 17, 1922. 15,270.

Inventor:
Charles T. Raschick
by: Arnold Fischer
Attorney.

UNITED STATES PATENT OFFICE.

CHARLES T. RASCHICK, OF ST. PAUL, MINNESOTA.

COMBINED PAD HOLDER AND TICKET PUNCH.

15,270. Specification of Reissued Letters Patent. Reissued Jan. 17, 1922.

Original No. 1,276,691, dated August 20, 1918, Serial No. 138,960, filed December 26, 1916. Application for reissue filed March 24, 1920. Serial No. 368,429.

*To all whom it may concern:*

Be it known that I, CHARLES T. RASCHICK, a citizen of the United States, residing at St. Paul, in the county of Ramsey and State of Minnesota, have invented a new and useful Improvement in Combined Pad Holders and Ticket Punches, of which the following is a specification.

This invention relates to certain new and useful improvements in combined pad holder and ticket punch and has for its especial object to provide means whereby pads of tickets in tablet or loose form of various thicknesses may be positioned and retained in the holder ready for use.

More particularly the invention is designed for use in connection with pad holder and punch such as set forth and described in my patent entitled "Combined pad holder and ticket punch" patented May 29, 1917, bearing Patent No. 1,228,046. The invention provides a punch associated with a pocket for holding the punch clippings in connection with a clamp for holding a pad of checks, the pocket being positioned on the opposite side of the holder from the carrying loop.

Further objects and advantages of the invention will be hereinafter set forth and the novel features thereof defined by the appended claims.

In the drawings forming part of this specification:

Figure 1:
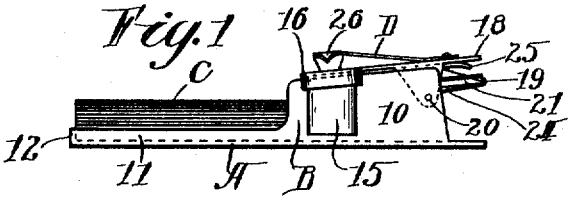
Fig. 1 is a side view of the invention showing a number of tickets held thereby.
Figure 2:
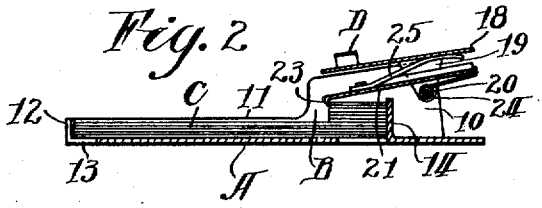
Fig. 2 is a longitudinal vertical section through the device.
Figure 3:
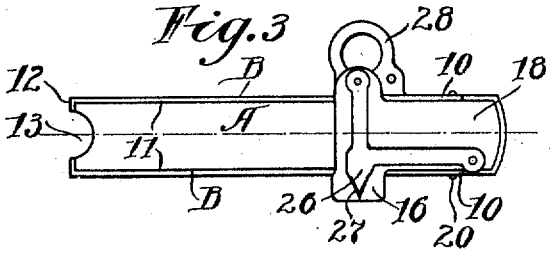
Fig. 3 is a plan view.
Figure 4:
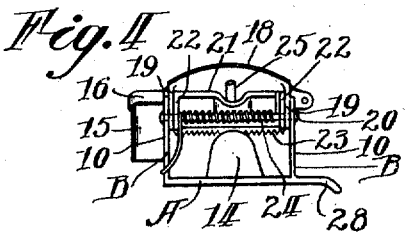
Fig. 4 is an end view.

In the drawing A represents a base formed of any suitable material and here shown as rectangular in shape, though it will of course be understood that any other preferred shape or configuration may be used if desired. Along each of the longitudinal edges of the base are formed upstanding flanges B, which for a portion of their length and at their corresponding ends are of considerably greater height as shown at 10, than throughout their remaining portion as shown at 11. A transverse flange 12 is formed at one extremity of the base and connects with the reduced ends of the flanges, said transverse flange being cut away intermediate its length and a portion of the base cut away to form a notch 13 which provides means so that the tickets C can be readily engaged at their free ends.

At the opposite end of the holder A to the flange 12 and between the portions 10 of the flanges B is an upwardly extending stop member 14 against which the tickets C are adapted to rest. If desired this stop member may be formed by stamping from the base and bending such stamped portion into vertical position at right angles to the plane of the base.

Secured upon the outer face of one of the flanges 10 is a pocket 15 having an open upper end adapted to be closed by means of a portion 16 of the plate 18 which is provided with downwardly depending ears 19 adapted to extend between and secured to the flanges 10.

A follower plate 21 of a suitable shape is positioned below the plate 18 between the flanges 10 and is formed with depending ears 22 which are positioned adjacent the ears 19 and freely pivoted to the rod 20. The forward edge of the plate 21 is provided with teeth 23 which are adapted to engage the stub of the pad under tension of a coil spring 24, one end of which is secured to one of the flanges 10 while the other end engages against the rear end of the plate 21 to hold the teeth in engagement with the pad C. Thus the plate 21 forms a self-adjusting clamping means to hold the pad C in the holder.

A spring 25 having one end secured to the plate 21 and the other end engaging against the lower surface of the plate 18, serves to normally hold the latter plate down with its free ends against the upper edges of the flanges 10 and holding the portion 16 of the plate in position to close the pocket 15.

The thickness of the pads C to be held by the holder A may vary, owing to the thickness of paper or number of checks or tickets in the pad and it will be apparent that the follower plate 21 will at all times compensate for such variation to provide a practical device. The pad C or its stub can be readily removed from the holder by engaging the rear end of the plate 18 and the adjacent end of the base, forcing them together against the action of the springs 24 and 25 thus releasing the pad or its stub so that a new pad can readily be inserted in the holder.

A punching member D, such as that described in my patent above referred to, is attached to the plate 18 and has a cutting end 26 which is adapted to cooperate with the aperture 27 in the cover portion 16 of the plate to punch or clip portions from the edge of the tickets of the pad when inserted beneath the punch so that the clippings will fall into the pocket 15 and be retained therein.

A carrying loop 28 is formed projecting from one side of the base A opposite the pocket 15 and is adapted to be engaged by a suitable hook, not illustrated, carried on the belt of the clerk or waiter, to position the holder with its punch convenient for use at any time without removing it from the hook if so desired.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. In a device of the character described, in combination, a casing comprising a base having flanges on its longitudinal edges adapted to hold a set of leaves, a follower plate journaled between said flanges above said base for engaging and retaining said leaves thereupon, a pocket having an open end secured to one of said flanges, a second plate journaled between said flanges for covering the open end of said pocket, and means interposed between said plates for normally holding said second plate in closed position.

2. In a device of the character described, in combination, a casing comprising a base having flanges on its longitudinal edges adapted to hold a set of leaves, a follower plate journaled between said flanges above said base for engaging and retaining said leaves thereupon, a second plate journaled between said flanges, and means interposed between said plates for normally holding said second plate in closing position.

3. A device of the character described, comprising, in combination, a base having flanges on its longitudinal edges adapted to hold a set of leaves, a pocket having an open end secured to one of said flanges, a plate pivotally mounted between said flanges and having a portion for covering the open end of said pocket, a follower plate journaled between said flanges for engaging and retaining said leaves thereupon, and means for maintaining said follower plate in securing position upon said leaves.

4. A device of the character described, comprising, in combination, a base having flanges on its longitudinal edges adapted to hold a set of leaves, a plate pivotally mounted between said flanges, a follower plate journaled between said flanges adapted to engage and retain said leaves thereupon, and spring means for maintaining said follower plate in securing position upon said leaves.

5. In a device of the character described, in combination, a casing comprising a base adapted to support a set of leaves, a follower plate journaled to and positioned above said base for engaging and retaining said leaves thereupon, a pocket having an open end secured to the side of said base, a second plate pivotally supported above said follower plate for covering the open end of said pocket and said follower plate and means interposed between said plates for normally holding said second plate in closed position.

6. A device of the character described including a supporting member for a pad of checks, a pivoted clamp mounted on said member, a clamp releasing plate member positioned over said clamp and substantially parallel thereto and pivoted to said supporting member, an end formed on said clamp releasing plate protruding rearwardly out of its point of pivot to said supporting member and means cooperating between said clamp releasing plate and clamp whereby the said clamp is released by exerting pressure on said protruding end of said clamp releasing plate.

7. A device of the character described including a supporting member for a pad of checks, a clamp member engaging said pad or checks, a pintle pivoting said clamp member and a clamp releasing member journaled on said pintle.

CHARLES T. RASCHICK.